United States Patent [19]

Damiano et al.

[11] Patent Number: 4,753,679
[45] Date of Patent: Jun. 28, 1988

[54] CEMENT PRODUCTS CONTAINING SURFACE TREATED INORGANIC PARTICULATES

[75] Inventors: John Damiano, Easton, Pa.; Alan H. Bruder, Newton, N.J.

[73] Assignee: Pfizer, Inc., New York, N.Y.

[21] Appl. No.: 873,008

[22] Filed: Jun. 11, 1986

[51] Int. Cl.$^4$ .............................................. C04B 24/08
[52] U.S. Cl. .................................... 106/95; 106/308 F
[58] Field of Search .............................. 106/95, 308 F

[56] References Cited

U.S. PATENT DOCUMENTS

| | | | |
|---|---|---|---|
| 2,003,613 | 6/1935 | Scripture, Jr. | 106/95 |
| 3,720,528 | 3/1973 | Jordan | 106/95 |
| 3,720,529 | 3/1973 | Jordan | 106/95 |
| 4,278,576 | 7/1981 | Goldman | 260/23 AR |
| 4,375,987 | 3/1983 | Lange et al. | 106/95 |
| 4,444,921 | 4/1984 | South, Jr. | 523/200 |

FOREIGN PATENT DOCUMENTS

| | | | |
|---|---|---|---|
| 39-7919 | 5/1964 | Japan | 106/95 |
| 55-95657 | 7/1980 | Japan. | |
| 57-100180 | 6/1982 | Japan. | |

Primary Examiner—Steven Capella
Attorney, Agent, or Firm—Peter C. Richardson; Lawrence C. Akers; Harold W. Ordway

[57] ABSTRACT

Particulate calcium carbonate or iron oxide pretreated with a fatty acid such as stearic acid or oleic acid is added to a cementitious product to improve its strength and resistance to water absorption and penetration. Dry, aqueous and nonaqueous methods of addition are employed.

11 Claims, No Drawings

CEMENT PRODUCTS CONTAINING SURFACE TREATED INORGANIC PARTICULATES

BACKGROUND OF THE INVENTION

This invention concerns the addition of pretreated inorganic particulates to a cementitious product to improve the product's strength properties and its resistance to water absorption and penetration.

It is well known that an increase in strength and a reduction in water absorption and permeability are desirable for cementitious products because of the increased durability that results. Among prior attempts at such property improvements is the use of additives, including fatty acids, to such products, which often contain other components, including limestone. For example, U.S. Pat. No. 4,375,987 discloses a water-dispersible additive for imparting water repellency to masonary cement, the cement being interground in the presence of the additive, which includes a fatty acid, plus other ingredients such as limestone. In Japanese Kokai 95657/80, an agent for addition to a waterproofing coating for concrete is prepared by reacting stearic acid with slaked lime and mica, and the resulting calcium stearate is blended with a dehydrating agent and other ingredients, including limestone, to form the coating.

Despite the many prior attempts at improving strength and water resistance of cement products, more effective means are constantly being sought. It is the primary objective of the present invention to provide such a means.

In Japanese Kokai 100180/82, a thickener such as calcium carbonate is added to cement milk, which may include a small amount of a fatty acid, to increase the viscosity of the cement milk.

The addition of fatty acid treated limestone to plastics for improving properties is disclosed, for example, in U.S. Pat. Nos. 4,278,576 and 4,444,921.

SUMMARY OF THE INVENTION

It has now been found that the addition of fatty acid treated inorganic particulates to cement products provides a marked improvement in the product's strength and water-resistance properties.

The present invention is therefore directed to a cementitious composition which comprises a cement and an effective amount of particulate inorganic substrate previously surface treated with a fatty acid. Preferably, the inorganic substrate is calcium carbonate or iron oxide, with an average particle size of from about 0.02 to 20 microns, and the fatty acid is oleic acid or stearic acid. The treated inorganic substrate is preferably present in the composition in the amount of from about 0.2 to 30 weight percent of the cement, while the cement is preferably present in the amount of from about 5 to 30 weight percent of the total solids of the composition.

The present invention also includes a method for preparing a cementitious product, which comprises the steps of surface treating a particulate inorganic substrate with a fatty acid; adding the treated inorganic substrate and particulate cement to a particulate base concrete formulation; blending the resulting mixture; adding water; and allowing the resulting wet blend to set. The cement and treated inorganic substrate may be blended prior to addition to the base concrete formulation, and the treated inorganic substrate is preferably added as a slurry in an aqueous or polar organic medium. The preparation may include the addition of particulate inorganic colorant to the base concrete formulation, especially together with the treated inorganic substrate as an aqueous slurry.

DETAILED DESCRIPTION OF THE INVENTION

The present invention is premised on the discovery that the addition to a cementitious product of a particulate inorganic substrate, such as calcium carbonate or iron oxide, which has been previously surface treated with a fatty acid results in a surprising improvement in the strength, water absorption and permeability properties of the product, the improvement being considerably greater than that observed with the addition of the substrate and fatty acid alone or separately.

While not wishing to be bound by a given theory, it is proposed that the marked improvement in the indicated properties results from the hydrophobicity the fatty acid coating on the substrate imparts to the substrate particles. The calcium silicate gel growing from hydrating cement particles during formation of the cementitious product pushes the hydrophobic particles away rather than enveloping the particles. The hydrophobic particles are eventually pushed into, and therefore plug, pores in the cement product that would otherwise be left open. Such action therefore prevents the creation of a continuous network of open pores that would reduce strength and increase water absorption and permeability.

By cementitious product is meant any product in which a cement is an essential inngredient. The cement may be present in the product at levels as low as about 1 weight percent of the total solids of the product, but will normally be present at from about 5 to 30, especially 8 to 25, weight percent. The cement may be any cement, calcium silicate (Portland) cements and calcium aluminate cements being most common.

The bulk of the cementitious product is a particulate base concrete formulation which will normally be a classified aggregate, such as sand used to prepare cement block and concrete for highways, and lightweight aggregate used to prepare lightweight compositions for such as roof tiles.

The particulate inorganic substrate may be any mineral in particulate form, the particles normally having an average particle size of from about 0.01 to 100, especially 0.02 to 20, microns. Such minerals include oxides of such as cobalt, iron, tin, titanium, zinc and zirconium, carbonates of such as barium, calcium, lead and magnesium, and silicates of such as calcium and magnesium. Calcium carbonates and iron oxides are preferred.

The particulate inorganic substrate is surface treated with a fatty acid, normally at a level of from about 0.2 to 20, preferably 1 to 10, grams fatty acid/100 grams substrate, the treatment being accomplished by intense dry mixing of the fatty acid and substrate at room or elevated temperature, or by reaction of a soluble form of the fatty acid with the substrate in slurry form. While any saturated or unsaturated fatty acid may be used for the surface treatment, or coating, stearic acid and oleic acid are preferred. Commercial examples of such surface treated substrates include Super-Pflex ® and Hi-Pflex ®, stearic acid coated precipitated calcium carbonate and ground limestone, respectively, supplied by Pfizer Inc., New York, NY. The surface treated particulate inorganic substrate is present in the cementitious product at a level of from about 0.1 to 50, preferably 0.2 to 30, and especially 1 to 20, weight percent of the cement in the product.

In preparing the cementitious product of the present invention, the treated inorganic substrate and particulate cement are added to the particulate base concrete formulation; the resulting mixture is blended; water is added; and the resulting mixture is blended; water is added; and the resulting wet blend is allowed to set. The treated inorganic substrate may be added dry or as an aqueous or nonaqueous slurry. When added dry, it may be blended with the cement prior to addition to the base concrete formulation. Suitable aqueous slurries of from about 40 to 80, preferably 50 to 70, weight percent treated substrate are readily prepared with the inclusion of from about 0.2 to 5 weight percent of a surfactant, preferably a nonionic surfactant, in the slurry to improve flowability, 0.1 to 0.5 weight percent of a thickener to a prevent settling, and 200 to 1000 ppm of a biocide. Nonaqueous slurries of similar concentrations are similarly prepared, replacing the water of the aqueous slurry with a polyol such as glycerol.

Such preparations of cementitious products may advantageously include the addition of a particulate inorganic colorant such as black, yellow or red iron oxide to produce a colored product. Such addition is readily accomplished by use of an aqueous slurry containing both the treated inorganic substrate and the inorganic colorant in an aqueous slurry prepared as described above, the colorant being present at a level of from about 10 to 40, preferably 20 to 30 weight percent of the slurry with the total content of the treated inorganic substrate and colorant in the slurry being from about 40 to 80, preferably 50 to 70, weight percent.

The following examples are merely illustrative of the present invention, the scope of which is defined by the appended claims.

EXAMPLE 1

To 500 g Portland cement and 1500 g aggregate sand was added 100 g stearic acid coated precipitated calcium carbonate[1] (20 g/100 g cement), and the mixture was dry blended for 5 minutes. Then 230 g water (11 g/100 g dry blend) was added, and the mixture blended an additional 10 minutes. The resulting wet blend was pressed into cylindrical pellets about 2.25 inches (5.8 cm) in diameter and 0.7 inch (1.8 cm) high using a pressure of about 200 psi (13.6 atm). The pressed pellets were cured for 4 hours in a humidity chamber at 120° F. (49° C.) and 95 percent relative humidity, then stored for 7 days under ambient conditions prior to testing.
(1) Super-Pflex ®200; precipitated calcium carbonate of average particle size 0.5–0.7 micron coated with 2.0 wgt % stearic acid; Pfizer Inc., New York, NY The cured pellets were evaluated for crushing strength, water absorption and permeability, employing the following procedures and with the following results:

(1) Crushing Strength (Carver press with manual loading; average of 3 determinations)—8,720 psi (593 atm);

(2) Water Absorption (ASTM C67-83, Section 7, 1984; average of 3 determinations)—6.7%;

(3) Permeability A cylindrical container having a diameter as that of the test pellets is clamped and sealed to the top of a pellet. Then 50 ml water is added to the container and, following a 5-minute equilibration period, air pressure of 5 psi (0.3 atm) is applied to the top of the container until the container is empty or for 25 minutes, whichever is shorter. The permeability is designated as the average time in minutes required for the pressurized water to permeate the pellet, i.e., to drain from the container, based on 3 determinations. A (+) indicates that at least one of the triplicate requires 25 minutes or more, while 25+ indicates all 3 samples require at least 25 minutes.

For comparison, control pellets were prepared and tested as above with the exception that no stearic acid treated precipitated calcium carbonate was added to the cement sand mixture. The control pellet had a crushing strength of 6,670 psi (454 atm), a water absorption of 8.7% and a permeability of 1.2 minutes.

EXAMPLE 2

The preparation and testing of Example 1 were repeated, with the exception that a stearic acid coated ground limestone[1] was substituted for the stearic acid coated precipitated calcium carbonate in the blend. The cured pellet had a crushing strength of 9,050 psi (616 atm), a water absorption of 7.2% and a permeability of 25+ minutes.
(1) Hi-Pflex ®100; ground limestone of average particle size 3.0–3.5 microns, top size 15 microns, coated with 1.0 wgt % stearic acid; Pfizer Inc.

EXAMPLE 3

The preparation and testing of Example 1 were essentially repeated, but with the coated calcium carbonate being added in aqueous slurry form and at dry basis levels of 5, 10 and 20 g/100 g cement, the water addition being corrected for that in the aqueous carbonate slurry. The sand and cement were initially dry blended for 5 minutes, the aqueous carbonate slurry and water added, and the wet mixture blended an additional 10 minutes prior to pressing into pellets.

In preparing the aqueous carbonate slurry, 200 g of the stearic acid coated precipitated calcium carbonate was slowly added to 100.2 g water containing 2.5 g octyl phenoxy polyethoxy ethanol dispersant[1] and 0.3 g biocide,[2] contained in a Cowles mixer running at 2500 RPM to form a uniform slurry containing 66.1 weight percent stearic acid coated precipitated calcium carbonate. Appropriate aliquots of the slurry were then used for additions to the sand/cement mixture as indicated above.
(1) Triton ®X-100; Rohm and Haas, Philadelphia, PA
(2) Tektamer ®38 A. D.; Merck and Co., Rahway, NJ Testing of the cured pellets from these preparations resulted in the following properties:

| Example | 3A | 3B | 3C |
| --- | --- | --- | --- |
| Carbonate level, g/100 g cement | 5 | 10 | 20 |
| Properties |  |  |  |
| Crushing strength, |  |  |  |
| psi | 7,650 | 8,970 | 11,440 |
| (atm) | (520) | (610) | (778) |
| Absorption, % | 7.9 | 7.1 | 6.9 |
| Permeability, minutes | 21.7(+) | 23.1(+) | 25+ |

Similar results are realized when the coated calcium carbonate is added in nonaqueous slurry form using glycerol and an anionic surfactant to prepare the slurry.

EXAMPLE 4

A sample of oleic acid treated precipitated calcium carbonate was prepared by intensely mixing 100 parts by weight of precipitated calcium carbonate[1] with 10 parts by weight of oleic acid[(2)] for 5 minutes in a Welex high intensity blender.

(1) Albaglos ®; precipitated calcium carbonate of average particle size 0.5–0.7 micron; Pfizer Inc.
(2) Technical grade 105; Darling and Co., Chicago, IL Some 350 g Portland cement and 1118 g lightweight aggregate[(3)] (1050 g dry basis) were dry blended for 5 minutes. Then 70 g of the oleic acid treated calcium carbonate (20 g/100 g cement) and 245 g water (total water 313 g or 22.4 g/100 g mixture) were added to the blend. The wet mixture was blended an additional 10 minutes, then formed into pellets, cured and tested as in Example 1, with the exception that the absorption test was run by immersing a disc in room temperature water for 5 hours and measuring the weight pickup.

(3) Port Costa Products Co., Port Costa, CA

The above preparation was then repeated, but with the addition of 52.5 g (15 g/100 g cement) of the oleic acid treated calcium carbonate.

As a comparison, the above preparation was repeated, first with no addition of the oleic acid treated calcium carbonate (C1), then with the oleic acid/calcium carbonate combination at the 20 g/100 g cement level but with the oleic acid and the calcium carbonate being added separately (C2).

Results of these preparations are as follows:

| Example | 4A | 4B | C1 | C2 |
|---|---|---|---|---|
| Additive |  |  |  |  |
| g/100 g cement | 20 | 15 | 0 | 20 |
| Added as | coated | coated | — | separate |
| Properties |  |  |  |  |
| Crushing strength, |  |  |  |  |
| psi | 3740 | 3580 | 2850 | 3580 |
| (atm) | (254) | (244) | (194) | (244) |
| Absorption, % | 3.8 | 5.5 | 20.6 | 15.6 |
| Permeability, minutes | 25+ | 25+ | 0.2 | 0.4 |

These results clearly indicate the unexpected improvement in crushing strength, water absorption and permeability properties of cement products containing as an additive a previously treated surface coated inorganic substrate.

EXAMPLE 5

Some 417 g of an aqueous 72 weight percent slurry of black iron oxide[(1)] (300 g dry weight) was diluted with 2.25 liters of water, and the diluted slurry heated to 85° C. Then 30 g stearic acid[(2)] (10 g/100 g iron oxide) was added and the mixture stirred an additional 5 minutes, 14.0 g of 28 percent ammonium hydroxide (6.1 percent molar excess) added, and the neutralized slurry held at 85° C. with stirring for an additional 90 minutes. The slurry was diluted with an equal volume of water, cooled to room temperature and adjusted to pH 3–6 with 0.2N hydrochloric acid to flock the stearic acid treated black iron oxide particles. The flock was filtered and washed with water, then air dried at 70° C. to a water content of less than 0.4 percent.

(1) Pferrisperse ® SX-5599; Pfizer Inc.
(2) Triple pressed; Darling and Co.

The stearic acid coated and uncoated iron oxides were each added in aqueous slurry form to a cement formulation as in Example 3, both alone and in combination with stearic acid coated precipitated calcium carbonate[(3)], and the cementitious pellets evaluated essentially as in Example 1 with the following results:

| Example | 5A | 5B | 5C | Control |
|---|---|---|---|---|
| Additive |  |  |  |  |
| Nature | coated black | uncoated black plus carbonate | coated black plus carbonate | uncoated black |
| g/100 g cement | 3.5 | 2.0 + 2.0 | 3.5 + 2.0 | 2.0 |
| Properties |  |  |  |  |
| Crushing strength, |  |  |  |  |
| psi | 7440 | 7690 | 8500 | 6250 |
| (atm) | (506) | (523) | (578) | (425) |
| Absorption, % | 5.8 | 6.7 | 5.4 | 7.2 |
| Permeability, minutes | 0.42 | 0.45 | 14.0 | 0.20 |

(3) Stearic acid coated precipitated calcium carbonate (Albaglos ®; 10 g/100 g)

These results clearly show that concrete blocks containing the stearic acid coated iron oxide perform better than those containing the uncoated additive, and that the combination of coated iron oxide and coated calcium carbonate is even more effective.

We claim:

1. A cementitious composition, which comprises a cement and a particulate inorganic substrate previously surface treated to completely coat the substrate with a fatty acid in the amount of from about 0.2 to 20 grams/100 grams substrate.

2. The composition of claim 1 wherein the inorganic substrate is calcium carbonate or iron oxide.

3. The composition of claim 1 wherein the fatty acid is oleic acid or stearic acid.

4. The composition of claim 1 wherein the treated inorganic substrate is present in an amount of from about 0.2 to 30 weight percent of the cement.

5. The composition of claim 4 wherein the cement is present in the amount of from about 5 to 30 weight percent of the total solids of the composition.

6. The composition of claim 1 wherein the average particle size of the inorganic substrate is from about 0.02 to 20 microns.

7. A method of preparing a cementitious product, which comprises the steps of:
   surface treating a particulate inorganic substrate with a fatty acid in the amount of from about 0.2 to 20 grams fatty acid/100 grams substrate to completely coat the inorganic substrate with the fatty acid;
   adding the treated inorganic substrate and particulate cement to a particulate base concrete formulation;
   blending the resulting mixture;
   adding water; and
   allowing the resulting wet blend to set.

8. The method of claim 7 wherein the cement and the treated inorganic substrate are blended prior to addition to the base concrete formulation.

9. The method of claim 7 wherein the treated inorganic substrate is added as a slurry in an aqueous or polar organic medium.

10. The method of claim 7 wherein particulate inorganic colorant is added to the base concrete formulation.

11. The method of claim 10 wherein the treated inorganic substrate and the inorganic colorant are added together as an aqueous slurry.

* * * * *